G. D. JONES.
Coffee Roaster and Grain Drier.
No. 46,301. Patented Feb. 7, 1865.
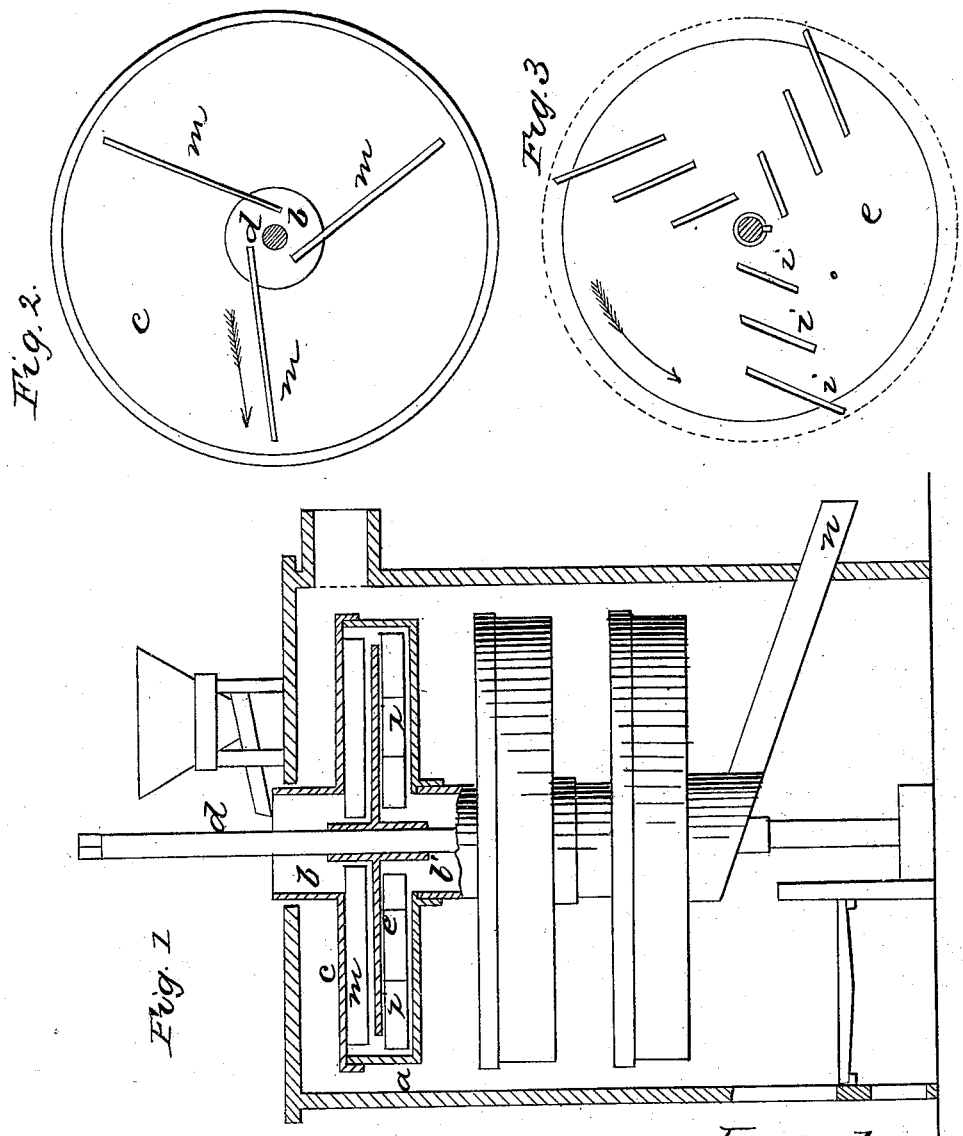

UNITED STATES PATENT OFFICE.

GILBERT D. JONES, OF NEW YORK, N. Y., ASSIGNOR TO HIMSELF AND CHARLES PLACE, OF SAME PLACE.

IMPROVED COFFEE-ROASTER AND GRAIN-DRYER.

Specification forming part of Letters Patent No. 46,301, dated February 7, 1865.

*To all whom it may concern:*

Be it known that I, GILBERT D. JONES, of the city, county, and State of New York, have invented a new and useful Improvement in Apparatus for Roasting Coffee; and I do hereby declare that the following is a full and clear description of my said invention, reference being made to the annexed drawings, forming a part of this specification, which are fully described herein, and in which similar letters indicate similar parts.

The apparatus which I have devised consists of a series of horizontal plates, each rotating in a separate circular stationary box, the top and bottom of which are also horizontal and form the heating-surfaces, and which boxes are set a short distance apart, one above another, and communicate with each other at the central portion by an inclosed passage, whereby the berries are made to pass through the apparatus without coming into contact with the external atmosphere. The rotating and the stationary plates are so arranged with relation to each other that the coffee received can be retained upon the first rotating plate just as long as is desired, then transferred to a stationary horizontal plate, from which it is again gathered to the center with the exact rapidity desired, to be transferred at the central portion to another inclosed rotating plate, and so on throughout a series of a sufficient number to cause the coffee to be sufficiently roasted.

The operation of properly parching or roasting coffee does not consist merely in drying the berries by the action of a temperature so great as to carbonize the surface when it has been so dried that the carbonization will result from the temperature employed, but it is required that each berry shall be dried just as little as will permit the parching, and that each berry shall of itself come into contact with the heated surface in order that it may become properly browned, quickly, to preserve as much as possible the aromatic quality and the volatile parts. Steam-heated surfaces do not suffice for this, and the series of stationary boxes inclosing the rotating plates is set up within a furnace so that they shall be heated by the direct action of the fire.

The construction and operation are as follows: At $a$, Figure I, is a comparatively thin circular box, which is to be stationary, and may be appropriately made of cast-iron. It has a tubular opening, $b$, from the center of the top plate, $c$, and a similar opening, $b'$, from the bottom plate. A vertical shaft, $d$, is placed centrally in this opening, being properly mounted to have rotary motion given it. A circular plate, E, affixed upon this shaft, is so placed that it will be about midway between the upper and lower surfaces. The upper side of this plate is horizontal and smooth, and upon it the coffee is fed in continuous stream through the opening $b$. It must be so much less in diameter thna the case $a$ that the berries will pass freely over its edge. The lower inclosing surface of the case is also to be smooth and horizontal, and on it is received the berries after they have been passed over the edge of the rotating plate E. Upon the under side of the plate E are flanges or wings $i$, extending nearly to the lower inclosing surface of the case, and so set as to gather the berries which have been thrown over the edge toward the center, where they will be delivered at $b'$ to the next rotating plate of the series. A suitable arrangement of these wings is shown in Fig. III, which is a view of the under side of the rotating plate. On the under side of the upper inclosing surface there are also similar flanges, $m$. These extend down so as nearly to touch the surface of the rotating plate, and are so set as to cause the berries to be steadily and certainly moved in due time over the edge of the rotating plate, and as shown in Fig. II. A number of such machines may be placed vertically one upon another, communicating by means of the tubular opening. These are to be inclosed within a furnace, as shown in Fig. I.

In operation, the shaft $d$ is made to rotate, and with it the plate E, affixed to it. The coffee is regularly fed from a hopper, and falling upon that plate is by its rotation, and the action of the stationary flanges $m$, conveyed in due time over the edge onto the lower inclosing surface, whence, by the action of the moving flanges $i$, the berries are gradually conveyed toward the center and discharged continuously upon the rotating plate below, which is affixed to the same upright shaft. As the surfaces on which the coffee rests are not inclined, the berries will be moved upon those by the action of the flanges *m* and *i*, and these may be so set that with a properly-regulated feed every berry may rest upon the metallic surface during its entire progress and all be thereby carbonized alike.

I claim—

Forming a coffee-roaster of a series of horizontal plates, each arranged to rotate within a closed box, the bottom of which is also horizontal, and which boxes receive and discharge near the center, substantially in the manner set forth herein.

In testimony whereof I have subscribed my name.

G. D. JONES.

Witnesses:
J. P. PIRSSON,
S. H. MAYNARD.